Dec. 6, 1966  O. W. SMITH  3,290,056
AIR OPERATED SUSPENSION FOR TANDEM TRUCK AXLES
Filed June 8, 1964

INVENTOR.
OTHO W. SMITH
BY
Lockwood, Woodard, Smith & Weikart
Attorneys

United States Patent Office 3,290,056
Patented Dec. 6, 1966

3,290,056
AIR OPERATED SUSPENSION FOR TANDEM
TRUCK AXLES
Otho W. Smith, 33 Oolitic Road, Bedford, Ind.
Filed June 8, 1964, Ser. No. 373,270
7 Claims. (Cl. 280—124)

This invention relates generally to trucks and truck-tractors, and more particularly to a tandem axle assembly for these which can be quickly placed into operation for increasing the load carrying capacity of the vehicle and distributing the weight thereof, or quickly moved out of operation when not needed, so as to eliminate unnecessary tire wear.

Many existing truck-tractors and trucks could be employed to handle greater loads if they had sufficient wheel and axle capacity. Many dump trucks are used with three axles in tandem arrangement. The same is true with trailers. However, the disadvantage of having extra sets of axles under a tractor or a trailer is the fact that when the vehicle is operating in an unloaded or lightly loaded condition, there are too many tires on the ground and unnecessary tire wear results. There are also other disadvantages such as, for example, excessively rough riding qualities.

It is, therefore, a general object of the present invention to provide means for readily increasing the load carrying capacity of existing truck-tractors, trucks, and trailers.

A further object is to provide means for decreasing tire wear and improving riding qualities of such vehicles.

A still further object is to provide means achieving the foregoing objects and characterized by efficient, sturdy, durable, and reliable construction, ease of installation, comparatively low cost, and which can be easily and quickly operated.

Described briefly, a typical embodiment of the present invention employs an axle having left-hand and right-hand upstanding guide posts mounted adjacent to and inboard of the left-hand and right-hand wheels on the axle. These guide posts are received in guide housings mounted to the vehicle frame side members. Inflatable air bags are connected to members of the guide housings both above and below the axle. The bags below the axle can be inflated when the bags above the axle are deflated to raise the axle and lift the road wheels off the ground surface. The lower bags can be deflated and the upper bags inflated to enable the road wheels through the axle to support the desired percentage of the vehicle weight. The percentage supported can be varied depending upon the pressure applied to the bags, the size of the bags, and to some extent upon the location and nature of the conventional suspension of the vehicle by the other wheels.

The full nature of the invention will be understood from the accompanying drawings and the following description and claims.

Figure 1:
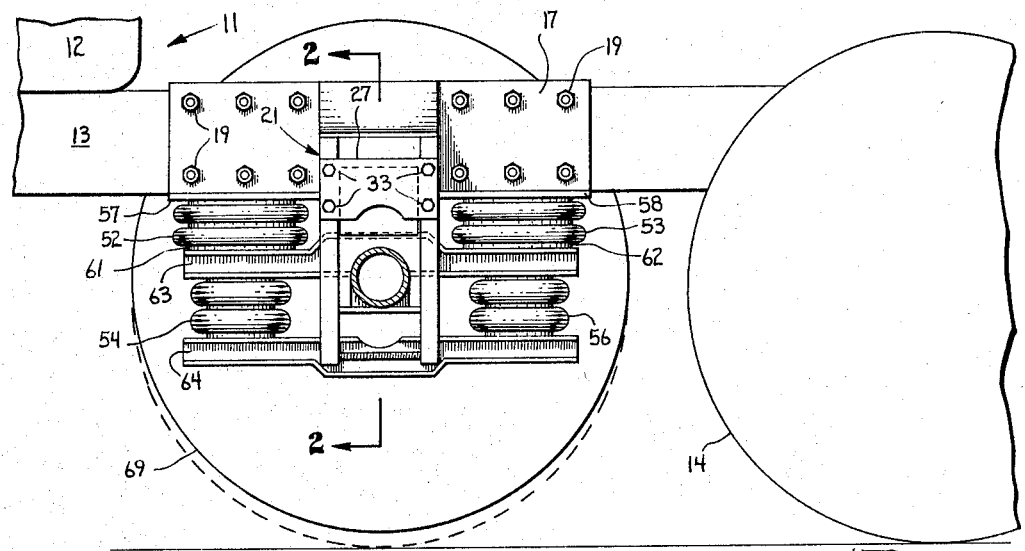
FIG. 1 is a fragmentary side elevational view of a portion of a truck showing a conventional road wheel, and a road wheel suspension according to the present invention, in tandem arrangement.

Referring to the drawings in detail, the tractor 11 includes a cab 12 and a frame having a pair of channel section frame side members disposed in the usual manner, the left-hand side member being designated by the reference numeral 13. This conventional truck frame is supported by one or more sets of road wheels, the outer left-hand road wheel 14 of the front set being shown in FIGURE 1. This wheel 14 is mounted with three other wheels in the usual manner to the forward axle of a tandem axle set, these being typically mounted to the frame in the usual conventional manner by leaf or coil springs or an air suspension.

Figures 2, 3:
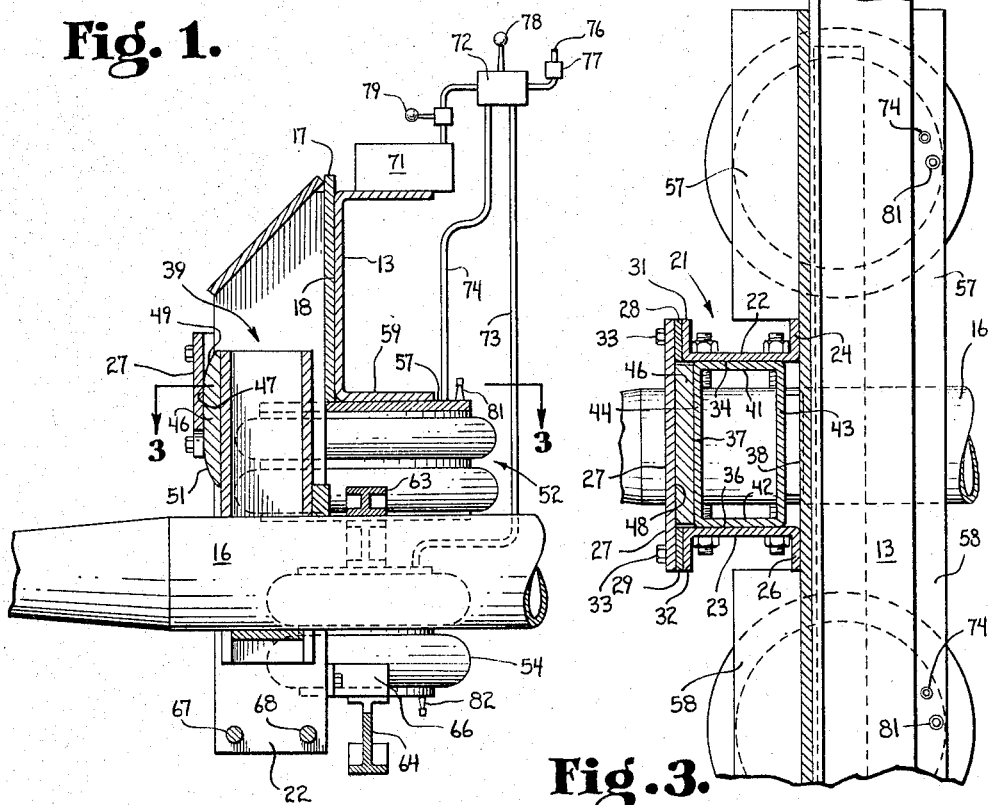
FIG. 2 is an enlarged cross section therethrough taken along the line 2—2 in FIGURE 1 and viewed in the direction of the arrows, the FIGURE 2 showing only the left-hand half of the suspension for the axle.
FIG. 3 is also a fragmentary view taken along the line 3—3 in FIGURE 2 and viewed in the direction of the arrows.

According to the present invention an extra axle 16 is added. FIGURE 2 shows the left-hand end portion of this axle, and the mounting thereof to the right-hand truck frame side member is identical. Therefore, the description of the left-hand portion thereof will suffice.

A mounting plate 17 is secured to the outside face 18 of the frame side member 13 by a series of bolts and nuts 19 (FIGS. 1). A downwardly extending vertical guide box 21 is connected to this mounting plate and includes front and rear vertically extending channel sections 22 and 23, the flange 24 and 26 thereof, respectively, being welded to the mounting plate 17. The guide box also includes an outer guide plate 27 which, together with the spacers 28 and 29, is mounted to the outer flanges 31 and 32 of the channel sections 21 and 23 by means of bolts 33. In this way, four guide surfaces 34, 36, 37, and 38 are provided for the upstanding guide post 39 which is welded to the axle 16. This guide post 39 includes the front and rear plates 41 and 42, respectively, and the inner and outer plates 43 and 44, respectively. The outer surfaces of plates 41 and 42 are disposed in a sliding fit with the inner faces of the web portions of the channel sections 22 and 23. A wear plate 46 is welded to the outer face of the plate 44 of the guide post and the outer face 47 thereof is in sliding fitting relationship with the inside face 48 of the plate 27. The spacing between the face 48 of the plate 47 and its counterpart at the right-hand side of the tractor frame is such that these plates serve to maintain the horizontal alignment of the axle with the vehicle frame. In order to accommodate some rolling motion of the axle 16 with respect to the vehicle frame the outer face 47 has a convex curved portion 49 at its upper end and 51 at its lower end. Therefore, as the vehicle moves down a straight road, or a curved road, the lateral position of the axle 16 is maintained with respect to the frame 13, even though some rolling motion of the axle with respect to the vehicle is permitted as the left or right-hand wheels go over bumps or into depressions in the roadway.

Any pitching or yaw action of the axle is prevented by the sliding fit between the front and rear channel plates 22 and 23 and the front and rear plates of the guide post. At each side of the vehicle, there are four commercially available inflatable bag assemblies 52, 53, 54, and 56. The upper ends of the units 52 and 53 are secured to the plates 57 and 58 which are welded to the mounting plate 17. The upper surfaces of the plates 57 and 58 are disposed flat against the lower surface of the lower flange 59 of the frame side member 13. The inflatable unit 52 has a rigid lower plate 61 and the inflatable unit 53 has a rigid lower plate 62. These plates are mounted on top of the front and rear end portions of an elongated connector bar 63 which is welded to the axle 16.

The rigid upper plates of the inflatable units 54 and 56 are secured to the lower faces of the support bar 63 in front of and behind the axle 16 and the lower rigid plates thereof are secured to the upper faces of a support bar 64 which is affixed to the guide housings by means of two brackets 66, each of which is welded to the support bar 64 and bolted to the inner flange of either the front or rear channel sections of the guide housing. A pair of bolts 67 and 68 is provided between the channel sections of the guide housing adjacent the lower margins thereof, to prevent spreading therebetween at that point.

In FIGURE 1, the axle 16 is shown supported so that the road wheels 69 at the right-hand end thereof are clear of the ground. In order to do this, the inflatable units 54 and 56 below the axle are inflated by application of air pressure. This can be done from a source of air pressure 71 through a control valve 72 and the air supply line 73 to the units 54 and 56. Meanwhile, the valve 72 vents the units 52 and 53 through the line 74 and valve assembly 72 and outlet 76 to atmosphere. If desired, a valve 77 can be provided in the vent at the valve body 72 and set to a predetermined pressure to always maintain a certain minimum pressure in all of the inflatable units. When it is desired to support a part of the vehicle weight by the axle 16, the valve lever 78 is manually moved to connect the line 74 to the air supply 71 and connect the line 73 through the valve 77 to the vent 76. This inflates the upper units 52 and 53 while the lower units 54 and 56 deflate. This moves the axle down whereupon the road wheels thereon engage the ground surface.

The inflatable units above the axle are of larger diameter than those below the axle. The diameter of those above the axle is such that the air pressure available thereto will exert a force upwardly on the frame after the wheels have engaged the ground which is equal to the load which it is desired to carry on the axle 16. This can be more or less than the load carried on the conventional axles, as desired. On the other hand, the units 54 and 56 need only be large enough to adequately support the wheel and axle assembly when they are not in use, so that even as the truck negotiates bumps, the wheels on the extra axle do not strike the ground. By providing the valve 77 in the vent line at a certain minimum pressure, the axle actually floats between the upper and lower air units, both when the axle is in use and when it is not in use.

If it is desired to vary the amount of pressure applied to the inflatable units, this can be done by operation of a controller 79. The valves and controllers as well as the supply source may be conventional, and the supply source could be a tank supplied by an engine compressor or any other suitable air supply.

When the upper air units are inflated placing the auxiliary road wheels on the ground, they will continue to extend vertically to a certain extent as part of the vehicle load is taken off the conventional springs, axles and wheels. This continued extension will make up for the normal flattening of the tires on the auxiliary axle at ground contact and the elevation of the frame caused by the conventional springs as part of the load begins to be supported by the auxiliary axle.

It can be observed from the construction of the device of the present invention, that the combination of the mounting plate 17 and the plates 57 and 58, the latter two of which may actually be portions of a single horizontal plate as shown in FIGURE 3 of the drawings, provides mounting surfaces at right angles which engage the right angle mounting surfaces provided by the web and lower flange of the tractor frame side member 13. In other words, the plates 17 and 57–58 present a sort of mounting "pad" received on the frame side member from below. This mounting pad at the left-hand side of the assembly of the present invention has its counterpart at the right-hand side which is received on the right-hand side frame side member of the tractor. The assembly of the present invention does, therefore, provide a "saddle" which receives the truck frame in front of the forward rear axle thereof and behind the truck cab. Because of the compact construction of the assembly of the present invention, when the wheels are removed from the usual brake drums mounted on the axle 16, the assembly can be slid under the tractor frame without even elevating it with jacks or the like. It can then be raised into position where the guide housings straddle the tractor frame and are bolted into place. Then the wheels can be mounted to the brake drums and upon connection of the air lines, the unit is ready for operation.

If it is ever desired to use the suspension of the present invention without the built-in air source and controller, this can also be done. For this purpose, conventional tire inflation valve assemblies with removable cores having manually operable valve stems can be used for each of the air containers. For example, the valve assemblies 81 are connected to the air units or balloons 52 and 53 and the valve assemblies 82 are connected to the air units 54 and 56. A conventional air chuck and hose at any service station can be connected to any of these to raise or lower the axle, as desired. Air can be bled from the other air units as required, in the conventional manner.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A vehicle comprising:

an elongated frame having first and second horizontally spaced parallel side members;

an elongated upstanding side mounting plate bolted to the outside face of each of said side members, an inwardly extending mounting plate affixed to each of said side mounting plates, the said mounting plates forming a saddle receiving the said frame side members, each side mounting plate having a vertical guide housing affixed thereto, each guide housing having front and rear parallel horizontally spaced guide surfaces and a side guide surface parallel to said frame side member;

a first axle extending across said frame, said axle having first and second road wheels mounted thereto for rotation thereon, said axle having first and second horizontally spaced vertical guide posts affixed thereto and extending upwardly therefrom outside of said frame side members, each guide post having plates with front and rear parallel horizontally spaced surfaces in a slide fit with the front and rear spaced guide surfaces of said guide housing to maintain constant the longitudinal position of said first axle with respect to said frame side members and prevent pitching of said axle with respect to said frame side members, and each guide post having an outer side guide plate with an outer surface slidingly engaging the side guide surface of said guide housing, each side guide plate of said guide posts having an intermediate surface adjoining upper and lower convex curved surfaces, the lower convex curved surface of said first guide post being at a distance from the upper convex curved surface of the second guide post equal to the horizontal distance between the intermediate surfaces of said guide posts whereby rolling motion of said axle with respect to said housing is accommodated to permit easy traverse of road irregularities by the said road wheels on said first axle;

first and second elongated rigid suspension connector bars, each of said bars being affixed to said first axle and disposed in vertically spaced relationship to and under one of said frame side members;

third and fourth elongated connector bars connected to said guide housings and disposed parallel to and under said first and second connector bars, respectively;

first and second vertically extendable resilient inflatable air container balloons, said first balloon being disposed between said first frame side member and said first connector bar in front of said axle, and said second balloon being disposed between said first frame side member and said first connector bar behind said axle;

third and fourth inflatable vertically extendable resilient air containing balloons, said third balloon being disposed between said second connector bar and said second frame side member in front of said axle and said fourth balloon being disposed between said second connector bar and said second side member behind said axle;

fifth and sixth vertically extendable inflatable air containing balloons disposed between said first connector bar and said fourth support bar in front of and behind said axle;

seventh and eighth vertically extendable inflatable air containing balloons disposed between said second connector bar and said fourth support bar in front of and behind said axle;

a conventional sprung wheel and axle assembly behind said first axle and normally supporting said frame side members at a first distance above the ground surface;

a pressurized air source mounted to said vehicle frame;

a manually operable control device supplied by said air source and having a first output connected to said first, second, third and fourth ballons and a second output connected to said fifth, sixth, seventh and eighth ballons, said control device having a pressure maintaining valve vented to atmosphere, said control device being operable to inflate said first, second, third and fourth balloons and thereby extend said balloons to increase the spacing between said first axle and said frame side members and force said first and second wheels connected to said first axle into contact with the ground surface and apply a portion of the load on said frame side members to said first axle, while said control device simultaneously deflates said fifth, sixth, seventh, and eighth ballons to a pressure established by said pressure maintaining valve, and said control device being operable alternately to supply pressure from said source to fifth, sixth, seventh, and eighth ballons and deflate through said pressure maintaining valve said first, second, third, and fourth ballons to raise said first and second road wheels out of contact with the ground surface, the first mentioned four of said ballons having a horizontal sectional area larger than the second mentioned four of said balloons by an amount determined by the difference in load to be applied thereby;

and a pressure selector valve between said source and said control device to establish the desired pressure in said ballons when inflated;

and upper and lower stop means provided on said guide housings to limit the vertical travel of said first axle.

2. A vehicle comprising:

an elongated frame having first and second horizontally spaced parallel side members;

first and second mounting plates affixed to each of said side members, each mounting plate having a vertical guide housing affixed thereto, each guide housing having front and rear parallel horizontally spaced guide surfaces and a side guide surface parallel to said frame side member;

a first axle extending across said frame, said axle having first and second road wheels mounted thereto for rotation thereon, said axle having first and second horizontally spaced vertical guide posts affixed thereto and extending upwardly therefrom, each guide post having front and rear parallel horizontally spaced guide surfaces in a slide fit with the front and rear guide surfaces of said guide housing to maintain constant the longitudinal position of said axle with respect to said frame side members and preventing pitching of said axle with respect to said frame side members and permit vertical guided movement of said axle with respect to said frame side members, and each guide post having a side guide surface slidingly engaging the side guide surface of one of said guide housings, each side guide surface of said guide posts having an intermediate surface adjoining upper and lower convex curved surfaces, the lower convex curved surface of the first guide post being at a distance from the upper convex surface of said second guide post equal to the horizontal distance between the intermediate surfaces of said guide posts whereby rolling motion of said axle with respect to said frame is accommodated to permit easy traverse of road irregularities by the said road wheels on said first axle;

first and second rigid suspension connectors, each of said connectors being affixed to said first axle and disposed in vertically spaced relationship to and under one of said frame side members;

third and fourth connectors connected to said guide housings and disposed paralled to and under said first and second connectors respectively;

first and second vertically extendable resilient inflatable air container ballons, said first ballon being disposed between said first frame side member and said first connector in front of said axle, and said second ballon being disposed between said first frame side member and said first connector behind said axle;

third and fourth inflatable vertically extendable air container ballons, said third ballon being disposed between said second connector and said second frame side member in front of said axle and said fourth ballon being disposed between said second connector and said second side member behind said axle;

fifth and sixth vertically extendable inflatable air container ballons disposed between said first connector and said fourth connector in front of and behind said axle;

seventh and eighth vertically extendable inflatable air container ballons disposed between said second connector and said fourth connector in front of and behind said axle;

a conventional sprung wheel and axle assembly behind said first axle and normally supporting said frame side members at a first distance above the ground surface;

a pressurized air source mounted to said vehicle frame;

a manually operable control device supplied by said air source and having a first output connected to said first, second, third, and fourth balloons and a second output connected to said fifth, sixth, seventh, and eighth balloons, said control device having a pressure maintaining valve vented to atmosphere, said control device being operable to inflate said first second, third, and fourth ballons and thereby extend said ballons to increase the spacing between said first axle and said frame side members and force said first and second wheels into contact with the ground surface and apply a portion of the load on said frame side members to said first axle, while said control device simultaneously deflates said fifth, sixth, seventh, and eighth ballons to a pressure established by said pressure maintaining valve, and said control device being operable alternately to supply pressure from said source to said fifth, sixth, seventh, and eighth balloons and deflate said first, second, third, and fourth balloons to raise said first and second road wheels out of contact with the ground surface, the first mentioned four of said balloons having a horizontal sectional area larger than the second mentioned four of said balloons by an amount determined by the difference in load to be applied thereby;

and a pressure selector between said source and said control device to establish the desired pressure in said balloons when inflated.

3. A vehicle comprising:

an elongated frame having a pair of horizontally spaced parallel side members;

mounting means affixed to said side members, said mounting means having a vertical guide means affixed thereto;

a first axle extending across said frame, said axle having first and second road wheels mounted thereto for rotation thereon, said axle having vertical guide means affixed thereto and guided by the vertical guide means on said frame to control the longitudinal and lateral position of said axle with respect to said frame side members;

first and second rigid suspension connectors, each of said connectors being affixed to said first axle and vertically spaced relationship to and under a portion of said mounting means;

third and fourth connectors affixed to said mounting means and disposed under said first and second connectors respectively;

first and second vetrically extendable inflatable fluid containers, said first container being disposed between said mounting means portion and said first connector and said second container being disposed between said second connector and said mounting means portion;

third and fourth vertically extendable inflatable fluid containers, said third container being disposed between said first and third connectors, said fourth container being disposed between said second and fourth connectors;

a conventional wheel and axle assembly behind said first axle and normally resiliently supporting said frame side members at a first distance above the ground surface;

a pressurized fluid source mounted to said vehicle frame;

a control device supplied by said source and having a first output connected to said first and second containers and a second output connected to said third and fourth containers, said control device being operable to inflate said first and second containers and thereby extend said units to increase the said distance between said frame side member and the ground surface and force the wheels connected to said first axle into contact with the ground surface and apply a portion of the load on said frame side members to said first axle, fhile said control device simultaneously deflates said third and fourth containers, said control device being operable alternately to supply pressure from said source to said third and fourth containers and deflate said first and second containers to raise said first and second road wheels out of contact with the ground surface.

4. In a wheel borne vehicle normally supported by a set of wheels for rolling operation on a ground surface, the combination comprising:

vehicle frame means;

saddle frame means received on said vehicle frame means by inserting said saddle frame means under said vehicle frame means and upward movement of said saddle frame means into fitting engagement with said vehicle frame means, said saddle frame means being thereupon affixed to said vehicle frame means;

a pair of road wheels;

axle means connected to said road wheels, said road wheels being rotatable on said axle means;

first pneumatic means connected to said axle means and said saddle frame means and expandable to increase the proportion of vehicle weight supported on said axle means;

and second pneumatic means connected to said axle means and said saddle frame means and expandable to reduce the proportion of vehicle weight supported by said axle means and raise said road wheels from the ground surface;

and control means coupled to a fluid pressure source and to said pneumatic means for selectively pressurizing and depressurizing said first pneumatic means and said second pneumatic means;

and a pressure holding vent valve connected to said control means and disposed to maintain at least a minimum pressure in said pneumatic means at all times, whereby said axle means floats on said first and second pneumatic means at all times;

vertical guide means on said axle means and said saddle frame means to maintain a fixed longitudinal and lateral position of said axle means with respect to said saddle frame means, said guide means including guide members formed to accommodate limited rolling action of said axle means with respect to said vehicle frame means and prevent pitching motion of said axle means with respect to said vehicle frame means.

5. For a wheel borne vehicle, the combination comprising:

a mounting frame and axle assembly means receivable under a vehicle frame and movable upwardly into straddling fixed connection with the vehicle frame, said frame having a pair of horizontally spaced parallel side members, mounting means affixed to said side members, said mounting means having a vertical guide means affixed thereto;

a first axle extending across said frame, said axle having first and second wheels mounted thereto for rotation thereon, said axle having vertical guide means affixed thereto and guided by the vertical guide means on said frame to control the longitudinal and lateral position of said axle with respect to said frame side members;

first and second rigid suspension connectors, each of said connectors being affixed to said first axle and vertically spaced relationship to and under a portion of said mounting means, third and fourth connectors affixed to said mounting means and disposed under said first and second connectors respectively;

first fluid operated adjustable support means connected to said axle means and said frame means between said first connector and said second connector and expandable to increase the proportion of vehicle weight supportable on said axle means;

and second fluid operated adjustable support means connected to said axle means and said frame means between said third connector and said fourth connector and expandable to raise said road wheels from a ground surface.

6. In a wheel borne vehicle normally supported by a set of wheels for rolling operation on a ground surface, the combination comprising:

vehicle frame means;

a pair of road wheels;

axle means connected to said road wheels, said road wheels being rotatable on said axle means;

first fluid operated adjustable support means connected to said axle means and said frame means and expandable to increase the proportion of vehicle weight supported on said axle means;

second fluid operated adjustable support means connected to said axle means and said frame means and expandable to reduce the proportion of vehicle weight supported by said axle means and raise said road wheels from the ground surface;

an inflation valve assembly connected to one of said support means and projecting outwardly therefrom and exposed to receive an air chuck for inflation of said first support means by a compressed air source separate from the vehicle.

7. The combination of claim 6 wherein said valve assembly has a removable valve core with a manually operable valve stem therein to selectively bleed fluid from said one support means.

References Cited by the Examiner

UNITED STATES PATENTS

| 2,042,596 | 6/1936 | Gouirand | 280—124 |
| 2,956,816 | 10/1960 | Pribonic | 280—124 |
| 3,133,745 | 5/1964 | Granning | 280—124 |
| 3,201,141 | 8/1965 | Bernstein | 180—22 |

FOREIGN PATENTS

| 1,242,573 | 8/1960 | France. |

BENJAMIN HERSH, *Primary Examiner.*

P. GOODMAN, *Assistant Examiner.*